United States Patent
Kim

(10) Patent No.: US 8,825,072 B2
(45) Date of Patent: Sep. 2, 2014

(54) FREQUENCY ALLOCATION METHOD AND APPARATUS IN MOBILE COMMUNICATION SYSTEM

(71) Applicant: Samsung Electronics Co. Ltd., Suwon-si (KR)

(72) Inventor: Young-Je Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/693,485

(22) Filed: Dec. 4, 2012

(65) Prior Publication Data

US 2013/0150059 A1    Jun. 13, 2013

(30) Foreign Application Priority Data

Dec. 9, 2011    (KR) .................. 10-2011-0131889

(51) Int. Cl.
*H04W 72/00* (2009.01)
*H04W 28/08* (2009.01)
*H04W 36/22* (2009.01)

(52) U.S. Cl.
CPC ............ *H04W 28/08* (2013.01); *H04W 28/085* (2013.01); *H04W 36/22* (2013.01)
USPC ...... 455/453; 455/450; 455/452.1; 455/452.2

(58) Field of Classification Search
CPC ............ H04W 28/00; H04W 28/0231; H04W 28/0284; H04W 28/0289; H04W 28/08; H04W 28/16; H04W 40/00; H04W 72/00
USPC .................. 455/450, 451, 452.1, 452.2, 453
See application file for complete search history.

(56) References Cited

U.S. PATENT DOCUMENTS

| 2009/0296574 | A1* | 12/2009 | Liao et al. ..................... 370/230 |
| 2010/0214915 | A1* | 8/2010 | Cai et al. ........................ 370/230 |
| 2012/0129517 | A1* | 5/2012 | Fox et al. ....................... 455/425 |
| 2012/0224650 | A1* | 9/2012 | Zhang et al. .................. 375/267 |
| 2012/0257497 | A1* | 10/2012 | Yoshimoto et al. ........... 370/230 |
| 2013/0230019 | A1* | 9/2013 | Manssour et al. ............ 370/330 |

* cited by examiner

*Primary Examiner* — Jean Gelin
(74) *Attorney, Agent, or Firm* — Jefferson IP Law, LLP

(57) ABSTRACT

A method and an apparatus for Frequency Allocation (FA) in a mobile communication system which separates a Radio Frequency (RF) unit and a digital unit are provided. A method of a digital central office including a plurality of channel cards includes processing signals of a plurality of cells corresponding to a plurality of RF units through the channel cards, measuring loads of the cells through the channel cards, determining FA per cell by considering the measured loads per cell, and operating the channel cards according to the determined FA per cell.

20 Claims, 3 Drawing Sheets

FREQUENCY ALLOCATION METHOD AND APPARATUS IN MOBILE COMMUNICATION SYSTEM

PRIORITY

The present application claims the benefit under 35 U.S.C. §119(a) of a Korean patent application filed on Dec. 9, 2011 in the Korean Intellectual Property Office, and assigned Serial No. 10-2011-0131889, the entire disclosure of which is hereby incorporated by reference.

BACKGROUND OF THE INVENTION

1. Field of the Invention

The present invention relates to a mobile communication system. More Particularly, the present invention relates to an apparatus and a method for Frequency Allocation (FA).

2. Description of the Related Art

In a cellular mobile communication system including a plurality of base stations, traffic of each base station can exhibit different distribution according to geographical characteristics and temporal characteristics. For example, the traffic of the base station placed in a business area of a city is high during the day and low during the night. In contrast, the traffic of the base station placed in a residential area of the city is low during the day and high during the night. Hence, in a mobile communication system of the related art, mobile communication operators predict maximum traffic per base station and determine Frequency Allocation (FA) of the base station based on the predicted maximum traffic.

However, since the mobile communication system of the related art determines the FA based on the maximum traffic of the base station as stated above, power and channel card resources are wasted in the FA based on the temporal characteristics. For example, provided that the base station expects 1,000-user access in the daytime and 100-user access in the night time, the FA of the base station is determined based on the 1,000 users. Accordingly, the base station is operated with as many channel cards as number of the FAs needed to support the 1,000 users. Thus, the base station can achieve high efficiency by supporting the number of the users corresponding to a maximum accessible capacity during the access time of the 1,000 users. However, when the base station supports the smaller number of the users than the maximum accessible capacity during the access time of the 100 users, the base station disadvantageously wastes resources. In addition, when users over 1,000 access the base station, communication quality of the existing users is deteriorated.

Further, since the traffic can vary according to the change of the mobile communication system environment, the mobile communication operator needs to increase or decrease the FA of each base station by periodically predicting the traffic per base station. The periodic traffic prediction and the FA extension and reduction cause the system operation expense to rise.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for Frequency Allocation (FA) in consideration of a load per cell in a mobile communication system.

Another aspect of the present invention is to provide a method and an apparatus for FA per cell by considering a load per cell with respect to a plurality of Radio Frequency (RF) units in a mobile communication system which separates an RF unit and a digital unit.

Yet another aspect of the present invention is to provide a method and an apparatus of a digital central office including a plurality of channel cards, for dynamically operating the channel cards by detecting a load per cell of a plurality of RF units in real time in a mobile communication system which separates an RF unit and a digital unit.

In accordance with an aspect of the present invention, a method of a digital central office comprising a plurality of channel cards in a mobile communication system which separates an RF unit and a digital unit is provided. The method includes processing signals of a plurality of cells corresponding to a plurality of RF units through the channel cards, measuring loads of the cells through the channel cards, determining FA per cell by considering the measured loads per cell, and operating the channel cards according to the determined FA per cell.

In accordance with another aspect of the present invention, an apparatus of a digital central office comprising a plurality of channel cards in a mobile communication system which separates an RF unit and a digital unit is provided. The apparatus includes the channel cards for processing signals of a plurality of cells corresponding to a plurality of RF units, and for measuring loads of the cells, and an FA manager for determining FA per cell by considering the measured loads per cell, and for operating the channel cards according to the determined FA per cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for determining Frequency Allocation (FA) of each cell by considering a load per cell with respect to a plurality of Radio Frequency (RF) units in a mobile communication system which separates an RF unit and a digital unit.

Figure 1:
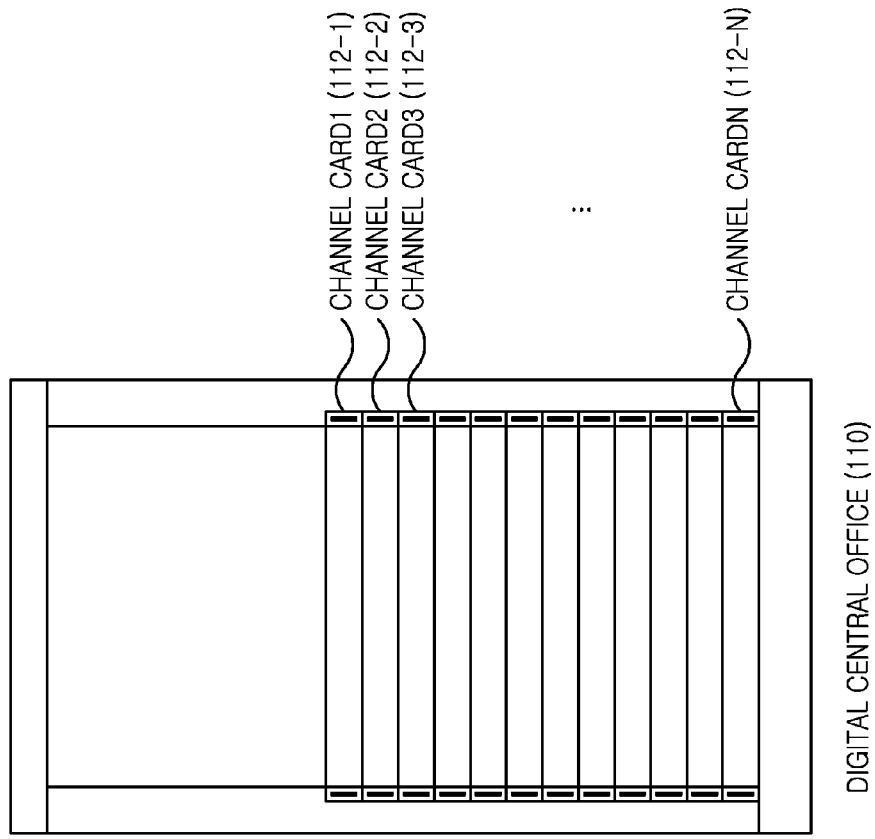
FIG. 1 illustrates a mobile communication system which separates a Radio Frequency (RF) unit and a digital unit according to an exemplary embodiment of the present invention.
Figure 1:
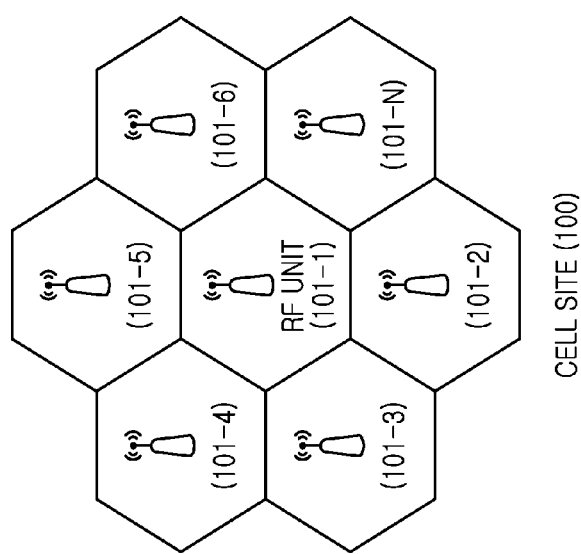

FIG. 1 depicts a mobile communication system which separates an RF unit and a digital unit according to an exemplary embodiment of the present invention.

As shown in FIG. 1, the mobile communication system separates RF units 101-1 through 101-N and the digital unit. The RF units 101-1 through 101-N are installed in a service area for sending and receiving signals to and from a user equipment and thus create a cell site 100. The digital unit is disposed at a digital central office 110 which controls the RF units 101-1 through 101-N. Hence, the single digital central office 110 includes a plurality of channel cards 112-1 through 112-N and processes signals of the RF units 101-1 through 101-N. The RF units 101-1 through 101-N and the digital central office 110 are connected using optical fiber cables (not shown).

The RF units 101-1 through 101-N installed in the cell site 100 send and receive radio signals to and from the user equipment in their cell coverage area under control of the digital central office 110. That is, the RF units 101-1 through 101-N each receive the radio signal from the user equipment traveling in the cell coverage area, convert the radio signal to a digital signal, provide the digital signal to the digital central office 110, convert a digital signal received from the digital central office 110 into an analog signal, and transmit the analog signal to the corresponding user equipment.

The digital central office 110 receives the signal of the user equipment from the RF units 101-1 through 101-N connected using the optical fiber cables, processes the digital signal of the user equipment, provides the signal to a higher node, processes the digital signal received from the higher node, and provides the signal to the corresponding RF unit 101-1 through 101-N. The digital central office 110 includes the plurality of the channel cards 112-1 through 112-N. Thus, the digital central office 110 dynamically allocates the FA to the cells according to cell conditions corresponding to the RF units 101-1 through 101-N, and operates the channel cards 112-1 through 112-N according to the FAs allocated to the cells.

Figure 2:
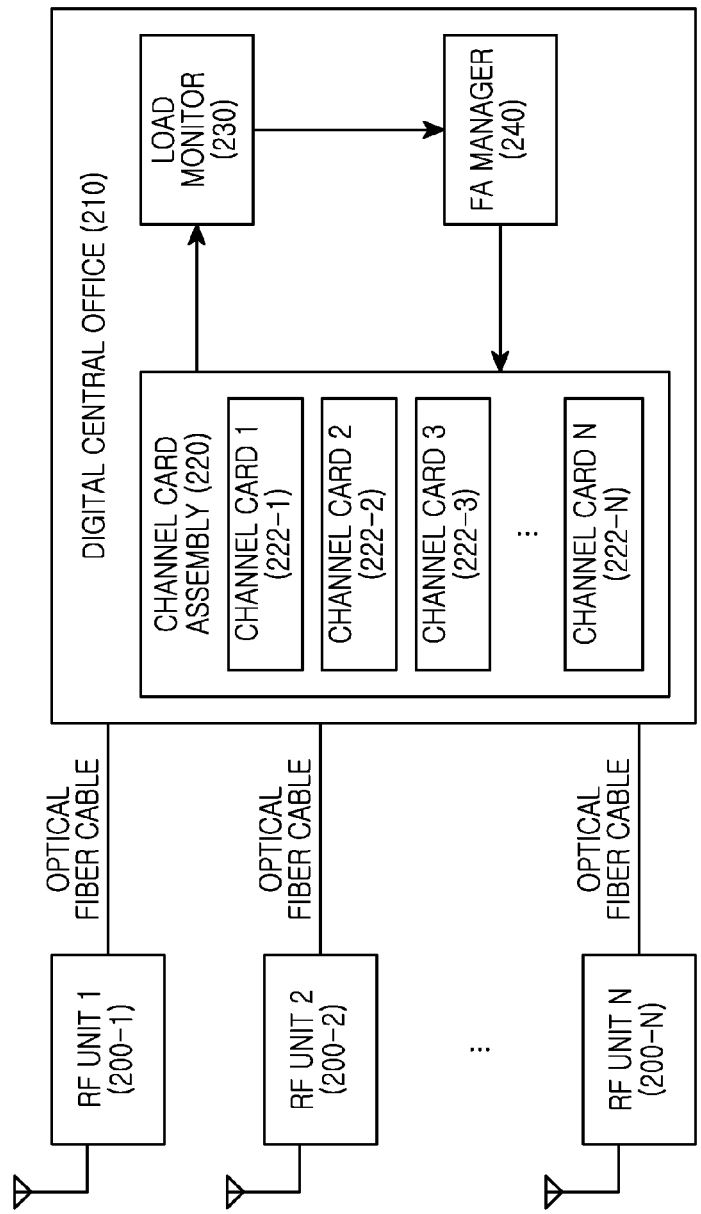
FIG. 2 illustrates a digital central office in a mobile communication system which separates an RF unit and a digital unit according to an exemplary embodiment of the present invention.

Hereafter, a detailed structure of the digital central office is explained by referring to FIG. 2.

FIG. 2 is a block diagram of a digital central office in a mobile communication system which separates an RF unit and a digital unit according to an exemplary embodiment of the present invention.

Referring to FIG. 2, the digital central office 210 includes a channel card assembly 220, a load monitor 230, and an FA manager 240.

The channel card assembly 220 includes a plurality of channel cards 222-1 through 222-N, and processes digital signals of RF units 200-1 through 200-N of the corresponding cell using the channel cards 222-1 through 222-N under control of the FA manager 240. Herein, the channel cards 222-1 through 222-N each include at least one modem and a controller which controls the at least one modem, in order to support the FA determined by the FA manager 240. The channel cards 222-1 through 222-N can process the digital signal of any one of the RF units 200-1 through 200-N under the control of the FA manager 240. For example, the first channel card 222-1 may process the digital signal of the first RF unit 200-1 under the control of the FA manager 240, or may process the digital signal of the second RF unit 200-2 under the control of the FA manager 240. When the FA manager 240 has not yet determined the FA to support, the channel cards 222-1 through 222-N operate in a standby mode and stand by until the FA manager 240 determines the FA to support. When the FA manager 240 requests to release the FA currently supported, the channel cards 222-1 through 222-N abort the digital signal processing of the corresponding FA and enter the standby mode. In so doing, the channel cards in the standby mode can be allocated by the FA manager 240 to a different cell which requires the FA extension.

The channel card assembly 220 measures loads of the FAs through the channel cards 222-1 through 222-N, and provides the measured load per FA to the load monitor 230. For example, the channel cards 222-1 through 222-N can measure the load of the FA by collecting information such as the number of access subscribers in their supporting FA, a receive power level increasing rate of a downlink channel, and resource utilization of an uplink channel. In so doing, the information collected to measure the load per FA can vary according to a design.

The load monitor 230 receives load information of the FAs from the channel cards 222-1 through 222-N of the channel card assembly 220, and converts the received load information per FA to load information per cell. That is, multiple FAs can be allocated to one cell. Hence, when receiving the load information of the FAs from the channel cards which support FAs allocated to a particular cell, the load monitor 230 gathers and converts the load information of the FAs to the load information of the particular cell. For example, the load monitor 230 can calculate and determine an average of the load information of the FAs allocated to the particular cell, as the load information of the particular cell. At this time, the load information can be expressed as a percentage. The load monitor 230 may directly calculate the load of the FA by receiving the necessary information to measure the load of the FA, rather than receiving the load information of the FAs from the channel cards 222-1 through 222-N. The load monitor 230 provides the calculated cell-based load information to the FA manager 240.

The FA manager 240 determines whether to increase or decrease the FA of each cell by considering the cell-based load information received from the load monitor 230, and increases or decreases the FA of each cell according to the determination. More specifically, the FA manager 240 determines whether to increase or decrease the FA of the corresponding cell by comparing the cell-based load information with an extension threshold or a reduction threshold. When the load information of a particular cell is greater than the extension threshold, the FA manager 240 determines to increase the FA of the particular cell and determines how many FAs are added. To add some FAs to the corresponding cell, the FA manager 240 can determine the number of the FAs to add by predicting whether the load information of the corresponding cell is smaller than the threshold.

Upon determining to increase the FA of the particular cell and determining the number of the FAs to add, the FA manager 240 determines whether the FAs to add can be allocated to the corresponding cell by comparing the number of the channel cards operating in the standby mode; that is, the number of the allocable channel cards with the number of the FAs to add. When the FAs to add can be allocated to the corresponding cell, the FA manager 240 selects channel cards corresponding to the number of the FAs to add from the allocable channel cards, and requests the selected channel cards to support the FA of the corresponding cell. When the FAs to add are not allocable to the corresponding cell; that is, when the number of the allocable channel cards is the smaller than the number of the FAs to add, the FA manager 240 stands by for a certain time and determines whether the FAs to add can be allocated to the corresponding cell by again comparing the number of the allocable channel cards with the number of the FAs to add. Herein, the FA manager 240 stands by for the certain time because the channel card supporting the FA allocated to a different cell becomes allocable due to the FA reduction of the corresponding cell and the number of the allocable channel cards can increase.

When the load information of the particular cell is smaller than the reduction threshold, the FA manager 240 determines to reduce the FA of the particular cell and determines the number of the FAs to release. In so doing, to release some of the FAs allocated to the corresponding cell, the FA manager 240 can determine the number of the FAs to release by predicting whether the load information of the corresponding cell is greater than the reduction threshold. Next, the FA manager 240 selects FAs corresponding to the number of the FAs to release among the FAs allocated to the corresponding cell, and requests the channel cards supporting the selected FAs to release the FA allocated to the corresponding cell. In so doing, the FA manager 240 deletes information of the selected FA from a channel list of the corresponding cell and an adjacent channel list of a neighboring cell, so as to prevent a new call or a handover call from accessing the FA selected as the FA to release. Before requesting the channel cards supporting the selected FAs to release the FA allocated to the corresponding cell, the FA manager 240 determines whether a user is accessing the selected FA. When a user is accessing the selected FA, the FA manager 240 stands by until the access of the user ends. Next, when the user access ends, the FA manager 240 requests the channel cards supporting the selected FAs to release the FA allocated to the corresponding cell. Herein, although the load information of the particular cell is smaller than the reduction threshold, the FA manager 240 does not reduce the FA of the particular cell when one FA is allocated to the particular cell. Herein, the FA manager 240 can determine whether to increase or decrease the FA by considering a preset priority.

The FA manager 240 manages FA information allocated to each cell. For example, the FA manager 240 generates and manages a channel list of the FA information allocated to the cells and an adjacent channel list of the FA information allocated to the neighboring cell, and updates the channel list and the adjacent channel list every time the FA is increased or decreased. The FA manager 240 can change and set the extension threshold and the reduction threshold according to a request of an operator.

Figure 3:
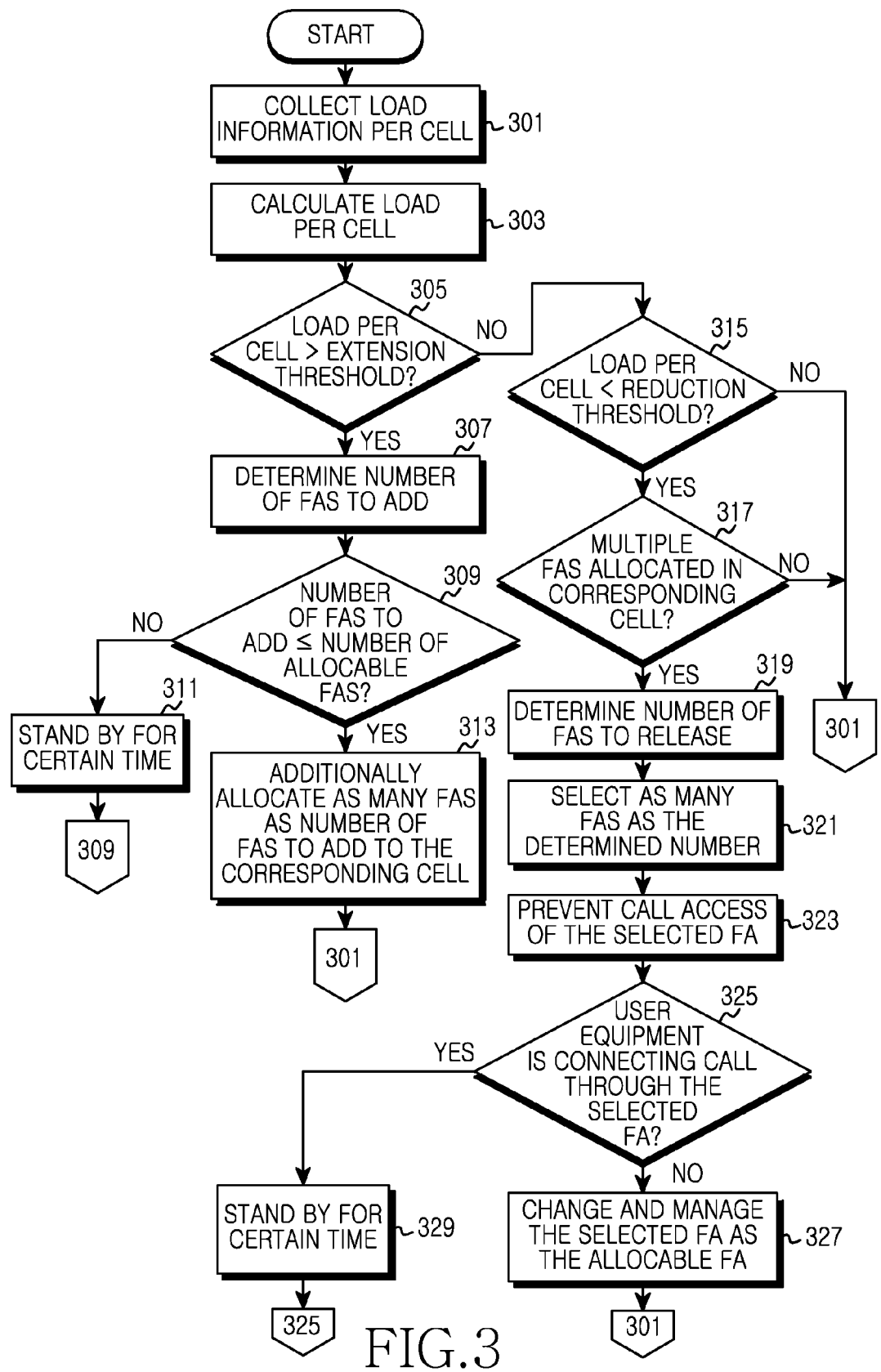
FIG. 3 illustrates a method for Frequency Allocation (FA) according to a load per cell in the digital central office of a mobile communication system according to an exemplary embodiment of the present invention.

FIG. 3 illustrates a method for FA according to a load per cell in a digital central office of a mobile communication system according to an exemplary embodiment of the present invention. Herein, it is assumed that a mobile communication operator determines the FA of each cell at the initial initiation by predicting the load information per cell in advance, and a plurality of channel cards of the central office is operated according to the determined FA.

Referring to FIG. 3, the central office collects the information to measure the cell-based load through the channel cards in step 301, and calculates the cell-based load based on the collected information in step 303. That is, the central office measures the load of the FA by first collecting the information such as the number of access subscribers in the FAs supported by the channel cards, the receive power level increasing rate of the downlink channel, and the resource utilization of the uplink channel. The central office then converts the measured load information of the FA to the cell-based load information. For example, when the multiple FAs are allocated to the single cell, the central office can obtain the load of the corresponding cell by calculating the average of the loads of the FAs. The cell-based load can be expressed as a percentage.

In step 305, the central office compares the load of each cell and the extension threshold. When the load of a particular cell is greater than the extension threshold, the central office determines to increase the FA of the particular cell and determines the number of the FAs to add for the particular cell in step 307. In so doing, to add some FAs to the particular cell, the central office can determine the number of the FAs to add by predicting whether the load information of the corresponding cell is smaller than the extension threshold.

In step 309, the central office compares the determined number of the FAs to add and the number of the currently allocable FAs. Herein, the number of the allocable FAs indicates the number of the channel cards to which the current FA is not allocated among the channel cards of the central office; that is, the number of the channel cards in the standby mode. When the number of the FAs to add is greater than the number of the allocable FAs, the central office stands by for a certain time in step 311 and returns to step 309. Herein, the central office stands by for the certain time until the channel card supporting the FA allocated to the different cell enters the standby mode due to the FA reduction of the different cell and becomes allocable.

In contrast, when the number of the FAs to add is smaller than or equal to the number of the allocable FAs, the central office additionally allocates the as many FAs as the number of FAs to add, to the corresponding cell in step 313. In so doing, the central office selects as many channel cards as the number of FAs to add among the currently allocable channel cards, and controls the selected channel cards to support the FA additionally allocated. The central office can select the FA and the channel card based on a preset priority. Next, the central office returns to step 301.

When the load of each cell is compared with the extension threshold and the load of a particular cell is smaller than or equal to the extension threshold in step 305, the central office compares the load of the particular cell and the reduction threshold in step 315. When the load of the particular cell is greater than or equal to the reduction threshold, the central office returns to step 301.

In contrast, when the load of the particular cell is smaller than the reduction threshold, the central office determines whether multiple FAs are allocated to the particular cell in step 317. When multiple FAs are not allocated to the particular cell; that is, when the single FA is allocated to the particular cell, the central office returns step 301 without reducing the FA of the particular cell.

In contrast, when multiple FAs are allocated to the particular cell, the central office determines the number of the FAs to release among the FAs allocated to the particular cell in step 319. In so doing, to release some of the FAs allocated to the particular cell, the central office can determine the number of the FAs to release by predicting whether the load information of the particular cell is greater than the reduction threshold. In step 321, the central office selects as many FAs as the determined number of FAs to release from the FAs allocated to the particular cell. The central office can select the FAs to release according to the preset priority. In step 323, the central office deletes the information of the FA from the channel list of the particular cell and the channel list of the neighboring cell, so as to prevent the call access using the selected FA. In step 325, the central office determines whether a user equipment is connecting a call through the selected FA. When detecting that the user equipment is connecting the call through the selected FA, the central office stands by for a certain time in step 329 and then returns to step 325.

When not detecting the user equipment is connecting the call through the selected FA, the central office changes and manages the selected FA to the allocable FA in step 327. In so doing, the central office aborts the operation of the channel card corresponding to the selected FA, switches the channel card into the standby mode, and then manages the channel card in the allocable state. Next, the central office returns to step 301.

As set forth above, in the mobile communication system which separates the RF unit and the digital unit, the central office including the plurality of the channel cards detects the load per cell with respect to the plurality of the RF units in real time, and increases or decreases the FA of each cell according to the detected cell-based load. Thus, the central office can dynamically operate the channel cards and efficiently utilize resources according to the traffic condition. That is, as the FA is managed based on the load per cell, interference of forward links between the cells can be mitigated and thus user's communication quality can be enhanced. The power can be saved by preventing the unnecessary FA use during the low traffic. Further, the operator does not have to increase or decrease the FA by periodically predicting the load per cell, and thus the system operation expense can be saved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a central station comprising a plurality of channel cards in a mobile communication system which geographically separates a Radio Frequency (RF) unit and a digital unit, the method comprising:

processing signals for the plurality of cells corresponding to a plurality of RF units through the channel cards;
measuring loads for the plurality of cells through the channel cards;
determining Frequency Allocation (FA) for each cell based on the measured loads for the plurality of cells; and
controlling the FA for each cell by operating the channel cards based on the determined FA for each cell,
wherein the central station comprises the digital unit, and
wherein the central station is connected to the plurality of RF units.

2. The method of claim 1, wherein the determining of the FA for each cell based on the measured loads for the plurality of cells comprises:
determining whether to increase or decrease the FA of a each cell by comparing the load of each cell with a preset threshold.

3. The method of claim 2, wherein the operating of the controlling of the FA for each cell by operating the channel cards comprises:
when determining to increase the FA of a specific cell, allocating at least one channel card currently allocable, among the channel cards, to the specific cell; and
when determining to decrease the FA of the specific cell, deallocating at least one channel card allocated to the specific cell.

4. The method of claim 2, wherein the determining of whether to increase or decrease the FA of each cell comprises:
comparing the load of a specific cell with a preset extension threshold;
when the load of the specific cell is greater than the extension threshold, determining to increase the FA of the specific cell; and
determining a number of FAs to add based on the extension threshold.

5. The method of claim 4, further comprising:
comparing the number of the FAs to add with a number of channels cards currently allocable;
when the number of the channel cards currently allocable is greater than the number of the FAs to add, selecting as many channel cards as the number of FAs to add among the channel cards currently allocable; and
determining any selected channel card as the channel card of the specific cell.

6. The method of claim 5, further comprising:
when the number of the channel cards currently allocable is smaller than the number of the FAs to add, waiting until the number of the channel cards currently allocable is greater than or equal to the number of the FAs to add.

7. The method of claim 2, wherein the determining of whether to increase or decrease the FA of each cell comprises:
comparing the load of the a specific cell with a preset reduction threshold;
when the load of the specific cell is smaller than the reduction threshold, determining to decrease the FA of the specific cell; and
determining a number of FAs to release based on the reduction threshold.

8. The method of claim 7, further comprising:
selecting as many FAs as the number of FAs to release among FAs allocated to the specific cell;
preventing a call access of any selected FA;
waiting until a call connected to any selected FA ends; and
determining to deallocate a channel card specific to any selected FA.

9. The method of claim 7, further comprising:
when determining to decrease the FA of the specific cell, determining whether a plurality of FAs is allocated to the specific cell; and
when a plurality of FAs is not allocated to the specific cell, maintaining the FA allocated to the specific cell.

10. The method of claim 1, wherein the measuring of the loads for the plurality of cells through the channel cards comprises:
measuring loads of FAs corresponding to the channel cards through the channel cards; and
determining the load for each cell using the measured loads of the FAs.

11. An apparatus of a central station comprising a plurality of channel cards in a mobile communication system which geographically separates a Radio Frequency (RF) unit and a digital unit, the apparatus comprising:
the channel cards configured to process signals of a plurality of cells corresponding to a plurality of RF units, and to measure loads of the cells; and
a Frequency Allocation (FA) manager configured to determine FA for each cell based on the measured loads for the plurality of cells, and to control the FA for each cell by operating the channel cards based on the determined FA for each cell,
wherein the central station comprises the digital unit, and wherein the central station is connected to the plurality of RF units.

12. The apparatus of claim 11, wherein the FA manager determines whether to increase or decrease the FA of a each cell by comparing the load of each cell with a preset threshold.

13. The apparatus of claim 12, wherein, when determining to increase the FA of a specific cell, the FA manager allocates and operates at least one channel card currently allocable, among the channel cards, to specific cell, and
wherein, when determining to decrease the FA of the specific cell, the FA manager deallocates at least one channel card allocated to the specific cell.

14. The apparatus of claim 12, wherein the FA manager compares the load of a specific cell with a preset extension threshold, determines to increase the FA of the specific cell when the load of the specific cell is greater than the extension threshold, and determines a number of FAs to add based on the extension threshold.

15. The apparatus of claim 14, wherein the FA manager compares the number of the FAs to add with a number of channels cards currently allocable, when the number of the channel cards currently allocable is greater than the number of the FAs to add, selects as many channel cards as the number of FAs to add among the channel cards currently allocable, and determines any selected channel card as the channel card of the specific cell.

16. The apparatus of claim 15, wherein, when the number of the channel cards currently allocable is smaller than the number of the FAs to add, the FA manager waits until the number of the channel cards currently allocable is greater than or equal to the number of the FAs to add.

17. The apparatus of claim 12, wherein the FA manager compares the load of a specific cell with a preset reduction threshold, determines to decrease the FA of the specific cell when the load of the specific cell is smaller than the reduction threshold, and determines a number of FAs to release based on the reduction threshold.

18. The apparatus of claim 17, wherein the FA manager prevents a call access of any selected FA by selecting as many FAs as the number of FAs to release among the FAs allocated to the specific cell, and determines to deallocate a channel card specific to any selected FA by waiting until a call connected to the selected FA ends.

19. The apparatus of claim 17, wherein, when determining to decrease the FA of the specific cell, the FA manager determines whether a plurality of FAs is allocated to the specific cell, and maintains the FA allocated to the specific cell when a plurality of FAs is not allocated to the specific cell.

20. The apparatus of claim 11, further comprising:
a load monitor for determining the load for each cell using loads of FAs measured through the channel cards.

* * * * *